(12) United States Patent
Ieki

(10) Patent No.: US 8,687,475 B2
(45) Date of Patent: Apr. 1, 2014

(54) OPTICAL PICKUP DEVICE, OPTICAL PICKUP UNIT AND DATA STREAMER APPARATUS

(75) Inventor: Koji Ieki, Osaka (JP)

(73) Assignee: Panasonic Corporation, Osaka (JP)

( * ) Notice: Subject to any disclaimer, the term of this patent is extended or adjusted under 35 U.S.C. 154(b) by 93 days.

(21) Appl. No.: 13/444,053

(22) Filed: Apr. 11, 2012

(65) Prior Publication Data

US 2013/0051202 A1 Feb. 28, 2013

(30) Foreign Application Priority Data

Aug. 31, 2011 (JP) ................. 2011-188429

(51) Int. Cl.
G11B 7/00 (2006.01)
G11B 7/135 (2012.01)
G11B 21/16 (2006.01)

(52) U.S. Cl.
USPC ............ 369/112.08; 369/44.15; 369/13.12; 369/53.19; 369/44.21; 369/112.01; 720/667; 720/681

(58) Field of Classification Search
USPC ............ 369/44.14–44.22, 13.11–13.14, 369/13.17–13.2, 13.22, 13.24, 13.32; 360/78.01–78.15, 240; 359/823, 814, 359/825

See application file for complete search history.

(56) References Cited

U.S. PATENT DOCUMENTS

| | | | | |
|---|---|---|---|---|
| 5,046,820 A | * | 9/1991 | Saekusa et al. | ............ 359/814 |
| 5,617,391 A | * | 4/1997 | Ono et al. | ............ 369/44.18 |
| 2001/0003521 A1 | * | 6/2001 | Hirai et al. | ............ 369/244 |
| 2001/0028623 A1 | | 10/2001 | Ijima et al. | |
| 2003/0161227 A1 | * | 8/2003 | Chong et al. | ............ 369/44.15 |
| 2005/0237900 A1 | * | 10/2005 | Sano et al. | ............ 369/112.08 |
| 2007/0171776 A1 | | 7/2007 | Uragami et al. | |
| 2008/0013413 A1 | * | 1/2008 | Ishii et al. | ............ 369/44.14 |

FOREIGN PATENT DOCUMENTS

| | | | |
|---|---|---|---|
| JP | 01-236434 A | 9/1989 |
| JP | 04-028025 A | 1/1992 |
| JP | 2000-235136 A | 8/2000 |
| JP | 2002-050062 A | 2/2002 |
| JP | 2005-149569 A | 6/2005 |
| JP | 2006-196116 A | 7/2006 |
| JP | 2006-286070 A | 10/2006 |
| JP | 2008-108342 A | 5/2008 |

OTHER PUBLICATIONS

Co-pending U.S. Appl. No. 13/444,289, filed Apr. 11, 2012.

* cited by examiner

*Primary Examiner* — Daniell L Negron
*Assistant Examiner* — Dionne Pendleton
(74) *Attorney, Agent, or Firm* — Renner, Otto, Boisselle & Sklar, LLP

(57) ABSTRACT

In one embodiment, an optical pickup device includes a fixed portion 100, a movable portion 11, first and second elastic supporting members 12a and 12b, one and the other ends of which are secured to the fixed portion 100 and the movable portion 11, respectively, and an objective lens 8 secured to the movable portion 11. The objective lens 8 is arranged inside of the area that is defined between two lines that are respectively drawn from one and the other ends of the first elastic supporting member 12a perpendicularly to the first elastic supporting member 12a and outside of the area defined between the first and second elastic supporting members 12a and 12b.

11 Claims, 13 Drawing Sheets

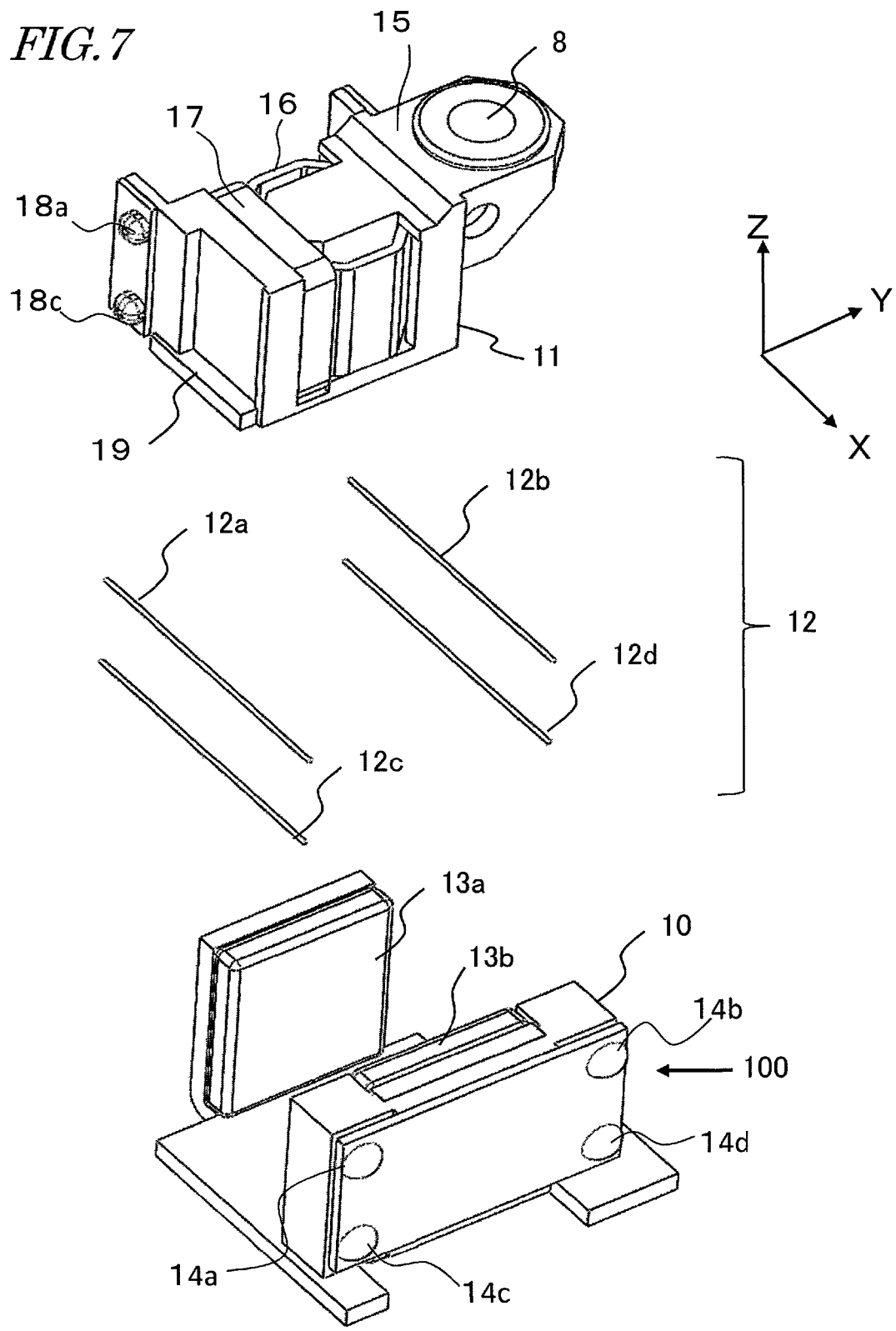

FIG.8A
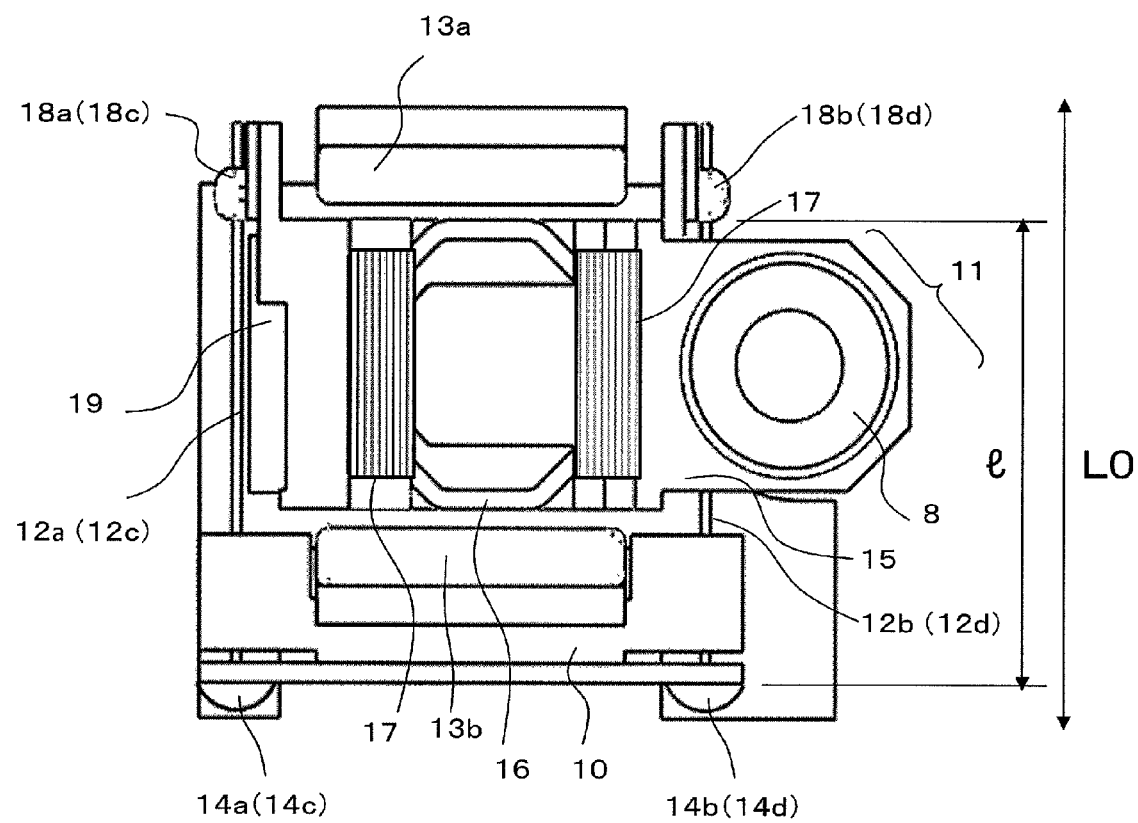
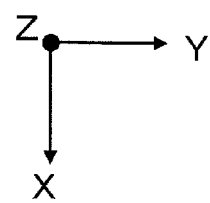

OPTICAL PICKUP DEVICE, OPTICAL PICKUP UNIT AND DATA STREAMER APPARATUS

BACKGROUND OF THE INVENTION

1. Field of the Invention

The present disclosure relates to an optical pickup device and an optical pickup unit, and also relates to a data streamer apparatus including the optical pickup device.

2. Description of the Related Art

An optical pickup device for use in a conventional optical disc drive includes a laser that functions as a light source and a lens actuator that drives an objective lens in focusing and tracking directions. The lens actuator includes a base portion which is fixed onto the body of the optical pickup device, a movable portion that mounts the objective lens thereon and that can move in the focusing and tracking directions, and an elastic supporting member which couples elastically the movable portion to the base portion. Coils are attached to the movable portion, and a magnet is attached to the base portion. By adjusting the direction and amount of the current flowing through the coils of the movable portion, magnetic force is applied to the coils within the magnetic field generated by the magnet, and the position and orientation of the movable portion can be controlled. The objective lens can have its position changed both perpendicularly to the surface of a given storage medium (i.e., in the focusing direction) and parallel to the surface of the storage medium and perpendicularly to the tracks on the storage medium (i.e., in the tracking direction). In order to move the lens in these two directions, a focus coil that produces force in the focusing direction and a tracking coil that produces force in the tracking direction are separately provided for the movable portion. And the elastic supporting member produces restitution force against these forces.

The elastic supporting member may be a wire, for example, the length of which is determined by the space that can be left in the optical pickup device and the power that needs to be supplied to move the movable portion. The wire usually has a length of 10 mm to 20 mm. And the wire is secured to the movable portion at two points that are close to both ends thereof in the tracking direction. That is why the objective lens is arranged inside of the region that is surrounded with the wire. Also, in order to drive the movable portion with good stability in both the focusing and tracking directions, the actuator may be designed so that the center of mass of the movable portion agrees with the center of the driving force in each of those two directions. Such a technique is disclosed in Japanese Laid-Open Patent Publication No. 2002-50062, for example.

Meanwhile, an optical tape apparatus (which is also called a "data streamer apparatus") that writes data on an optical tape is being developed as a storage device with a huge storage capacity. An example of such an optical tape apparatus is disclosed in Japanese Laid-Open Patent Publication No. 2006-286070.

Recently, it has become more and more necessary to further reduce the size of an optical pickup device for optical discs perpendicularly to the disc surface. As for directions that are parallel to the disc surface, i.e., the track running direction and the tracking direction, the arrangement of the optical disc drive and optical pickup device can be modified within the space that is defined by projecting the overall area occupied by the optical disc. That is why as far as optical discs are concerned, plenty of space is left to arrange the wire and the objective lens in the objective lens actuator in those directions that are parallel to the disc surface.

On the other hand, in an optical tape storage device, only a narrow space is left to arrange the pickup device with respect to the tape running direction.

It is therefore an object of the present invention to provide an optical pickup device that can reduce the space to be left in the tape running direction compared to conventional ones.

SUMMARY OF THE INVENTION

An optical pickup device according to one aspect of the present invention includes a laser diode and a lens actuator. The lens actuator includes: an objective lens; a fixed portion; a movable portion that supports the objective lens and that is able to change its position and orientation with respect to the fixed portion; a magnetic field generator that is arranged so as to apply magnetic force to at least part of the movable portion; and first and second elastic supporting members that couple the movable portion elastically to the fixed portion. When viewed parallel to the optical axis of the objective lens, a first point of connection between the first elastic supporting member and the fixed portion, a second point of connection between the first elastic supporting member and the movable portion, a third point of connection between the second elastic supporting member and the fixed portion, and a fourth point of connection between the second elastic supporting member and the movable portion are respectively located at the four vertices of a quadrilateral; the center of the objective lens is located inside of an area that is defined between a first line that passes the first and third points of connection and a second line that passes the second and fourth points of connection and is located outside of an area that is defined between a third line that passes the first and second points of connection and a fourth line that passes the third and fourth points of connection.

In one embodiment of the present invention, the movable portion includes a coil that is arranged to receive magnetic force from the magnetic field generator according to the amount of current. And when viewed parallel to the optical axis of the objective lens, the coil is located inside of both the area between the first and second lines and the area between the third and fourth lines.

In this particular embodiment, the movable portion includes a counter weight with a predetermined weight. And when viewed parallel to the optical axis of the objective lens, the counter weight is located inside of the area between the first and second lines and the coil is located between the counter weight and the objective lens.

In another embodiment, the movable portion includes an objective lens holder that holds the objective lens and a coil supporting portion around which the coil is wound. The coil supporting portion and the counter weight are made of the same material.

In an alternative embodiment, the movable portion includes an objective lens holder that holds the objective lens and a coil supporting portion around which the coil is wound. The coil supporting portion and the counter weight are made of mutually different materials.

In yet another embodiment, the coil is divided into a focus coil portion and a tracking coil portion.

In yet another embodiment, the fixed portion includes a plate portion that runs perpendicularly to the third and fourth lines and that supports the first and second elastic supporting members.

In yet another embodiment, the optical pickup device further includes an optical base that has the laser diode built in and that has upper and side surfaces, and the actuator is secured to the upper surface of the optical base.

In this particular embodiment, the length of the first and second elastic supporting members is substantially equal to the size of the upper surface of the optical base as measured in the length direction of the first and second elastic supporting members.

An optical pickup unit according to another aspect of the present invention includes a plurality of optical pickup devices, each of which includes a laser diode and a lens actuator. The lens actuator includes: an objective lens; a fixed portion; a movable portion that supports the objective lens and that is able to change its position and orientation with respect to the fixed portion; a magnetic field generator that is arranged so as to apply magnetic force to at least part of the movable portion; and first and second elastic supporting members that couple the movable portion elastically to the fixed portion. When viewed parallel to the optical axis of the objective lens, a first point of connection between the first elastic supporting member and the fixed portion, a second point of connection between the first elastic supporting member and the movable portion, a third point of connection between the second elastic supporting member and the fixed portion, and a fourth point of connection between the second elastic supporting member and the movable portion are respectively located at the four vertices of a quadrilateral; the center of the objective lens is located inside of an area that is defined between a first line that passes the first and third points of connection and a second line that passes the second and fourth points of connection and is located outside of an area that is defined between a third line that passes the first and second points of connection and a fourth line that passes the third and fourth points of connection.

In one embodiment of the present invention, the plurality of optical pickup devices include two optical pickup devices. In each of the two optical pickup devices, the objective lens is located closer to the second elastic supporting member than to the first elastic supporting member and is also located between its own and the other optical pickup device's second elastic supporting members.

In a specific embodiment, an interval of 4 to 8 mm is left between the respective centers of the objective lenses of the two optical pickup devices.

An optical pickup unit according to still another aspect of the present invention includes a plurality of optical pickup devices, each of which includes a laser diode and a lens actuator. The lens actuator includes: an objective lens; a fixed portion; a movable portion that supports the objective lens and that is able to change its position and orientation with respect to the fixed portion; a magnetic field generator that is arranged so as to apply magnetic force to at least part of the movable portion; and first and second elastic supporting members that couple the movable portion elastically to the fixed portion. The optical pickup device further includes an optical base that has the laser diode built in and that has upper and side surfaces. The actuator is secured to the upper surface of the optical base. When viewed parallel to the optical axis of the objective lens, the length of the first and second elastic supporting members is substantially equal to the size of the upper surface of the optical base as measured in the length direction of the first and second elastic supporting members.

A data streamer apparatus according to yet another aspect of the present invention includes an optical pickup unit according to any of the embodiments of the present invention described above and a motor that drives an optical tape.

This description discloses an optical pickup device that can reduce the space to be left in the tape running direction compared to conventional ones.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 7 is an exploded perspective view of the optical pickup device shown in FIG. 6.

FIG. 8A is a top view of the optical pickup device shown in FIG. 6.

Figure 9:
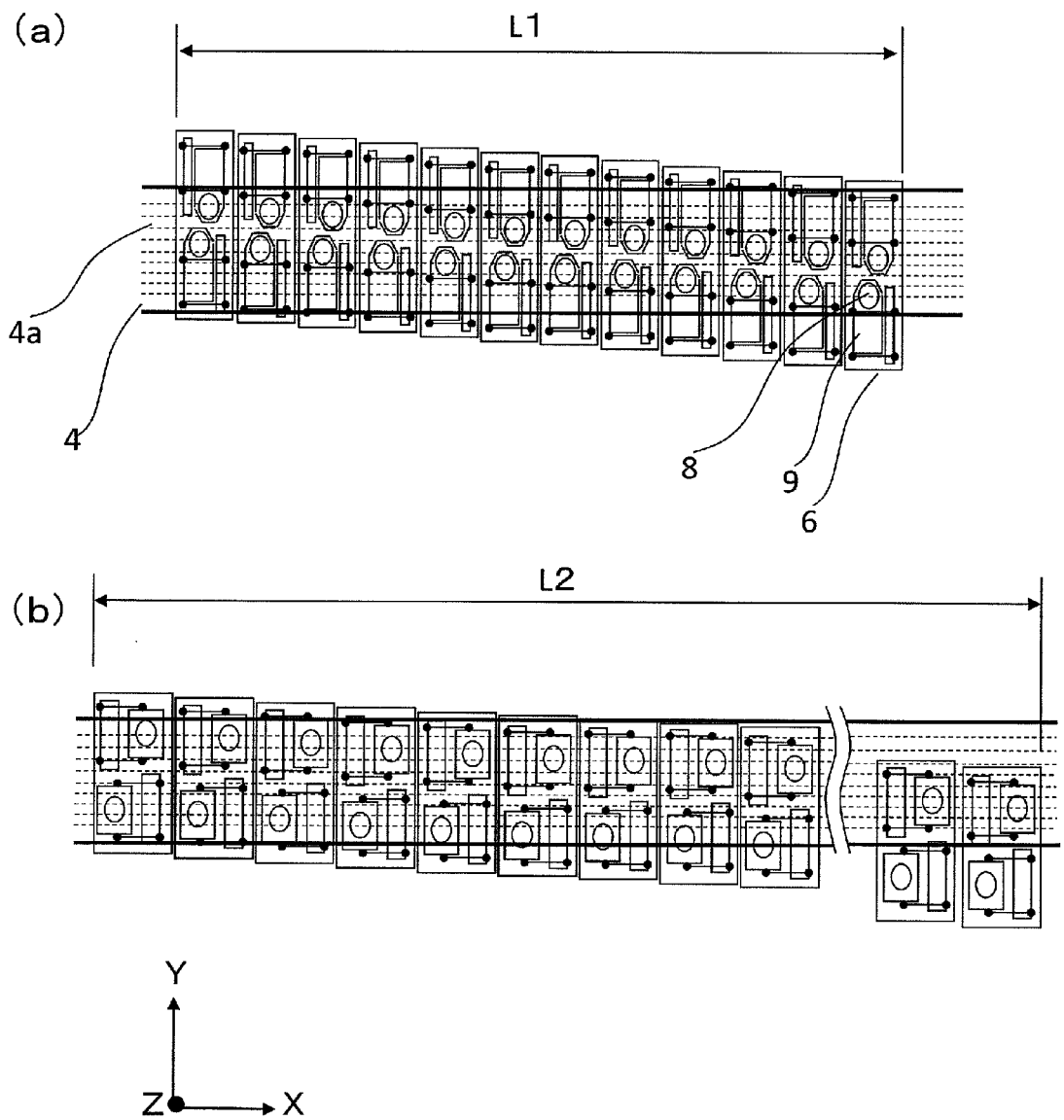

Portion (a) of FIG. 9 illustrates an exemplary configuration for an optical pickup unit according to an embodiment of the present invention, while portion (b) of FIG. 9 illustrates a configuration for an optical pickup unit as a comparative example.

Figure 10:
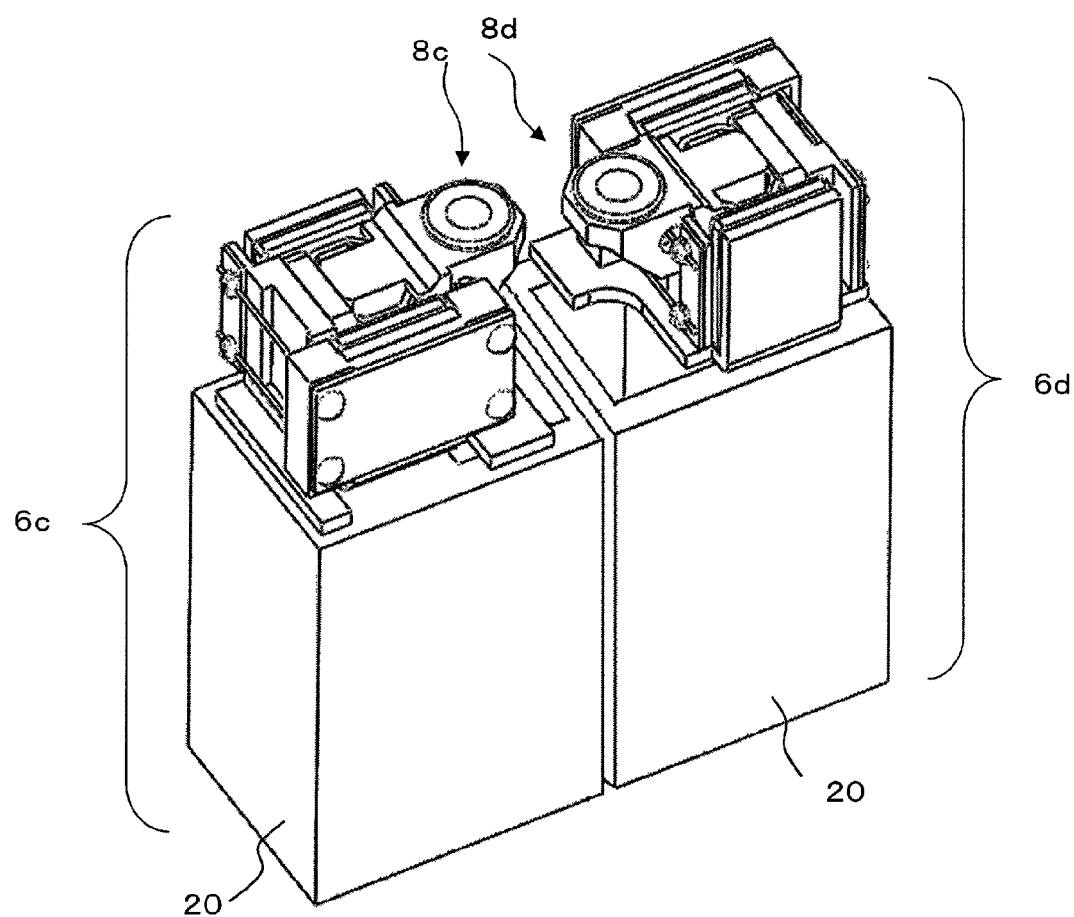

FIG. 10 is a perspective view illustrating an optical pickup device as another embodiment of the present invention.

Figure 11:
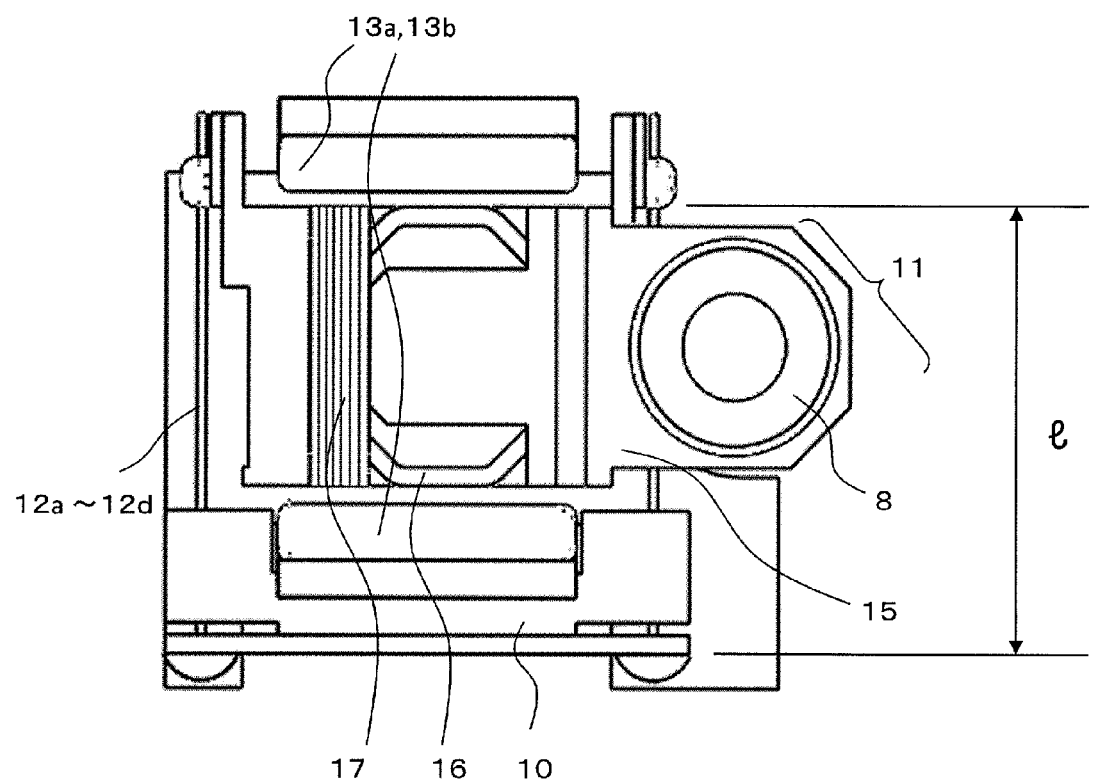

FIG. 11 is a top view illustrating an optical pickup device as still another embodiment of the present invention.

DETAILED DESCRIPTION OF EMBODIMENTS

Figure 1A:
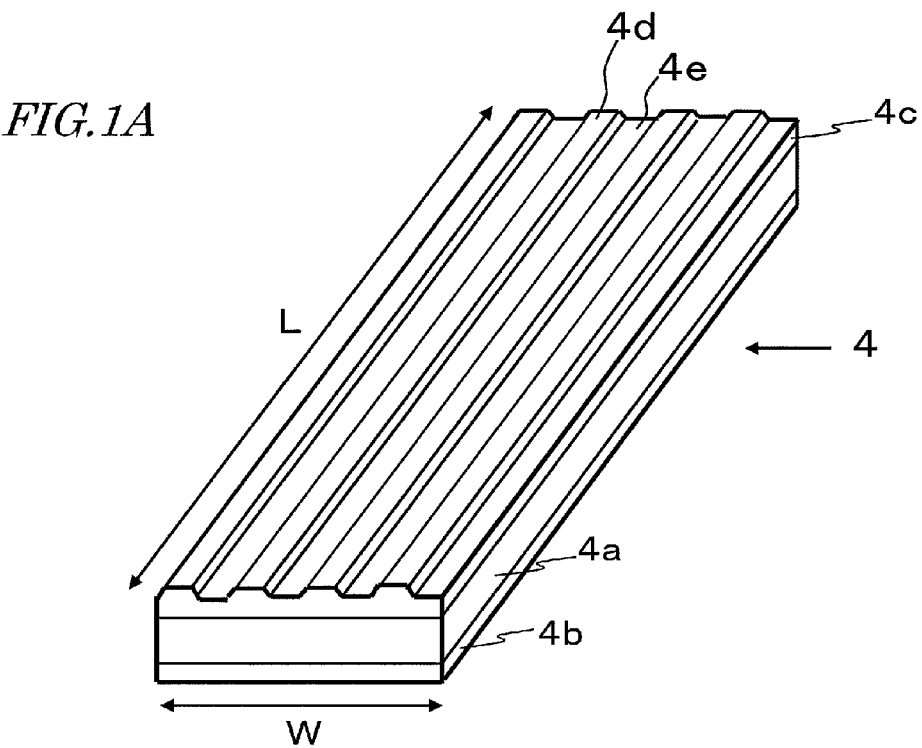
FIG. 1A is a perspective view illustrating a portion of an optical tape on a larger scale.

FIG. 1A is a perspective view schematically illustrating a portion of an optical tape 4 on a larger scale. The optical tape 4 may include a base film 4a, a back coating layer 4b that is adhered to the back surface of the base film 4a, and an imprint layer 4c that is supported by the base film 4a. On the upper surface of the imprint layer 4c, lands 4d and grooves 4e have been formed. Although not shown in FIG. 1A, a reflective film and a recording material film are deposited over the entire upper surface of the imprint layer 4c. The optical tape 4 is extended in the longitudinal direction L and may have a length of several ten meters, for example. Its width W may be set within the range of a few millimeters to several centimeters, and its thickness may be within the range of a few micrometers to several ten micrometers.

It should be noted that FIG. 1A illustrating the optical tape 4 is not to scale. Actually, the optical tape 4 may have several hundreds, or an even greater number, of lands 4d and grooves 4e. In one embodiment of the present invention, data is written on either the lands 4d or the grooves 4e. The lands 4d or the grooves 4e on which data is written will be referred to herein as "tracks", which may have a pitch of 0.2 μm to 0.4 μm, for example.

Figure 1B:
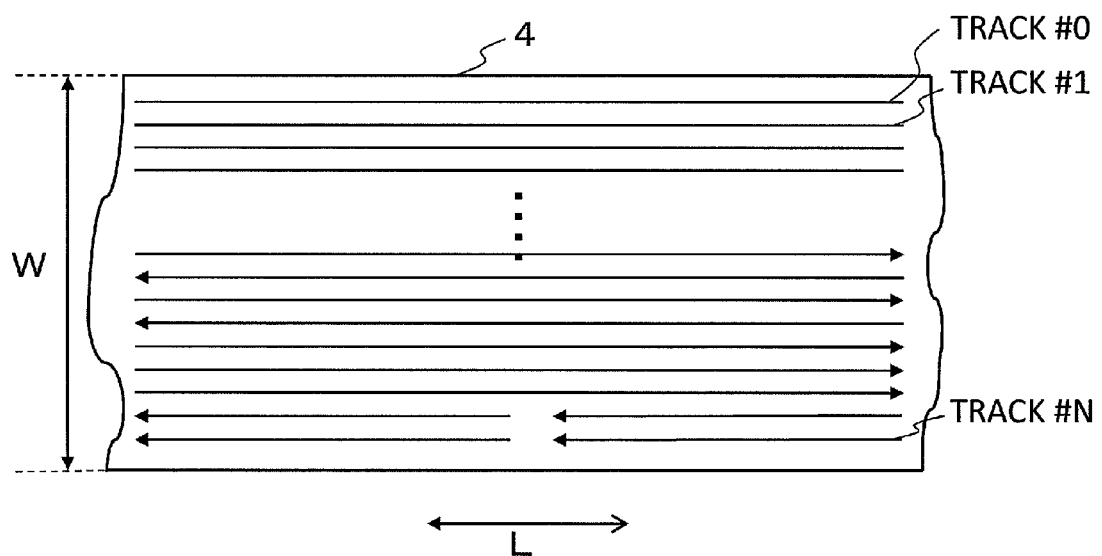
FIG. 1B is a top view schematically illustrating a portion of the optical tape.

FIG. 1B is a top view schematically illustrating a portion of the optical tape 4. As shown in FIG. 18, N (which is an integer that is typically equal to or greater than 100) tracks #0 through #N have been formed to run in the longitudinal direction L. Some of those tracks illustrated in FIG. 1B are illustrated with an arrow. Each of those arrows indicates the direction in which data is written. That is to say, data can be written in multiple different directions on a single optical tape 4.

On the optical tape 4, a mark can be recorded optically by irradiating the tape 4 with a light beam. More specifically, such a mark is recorded on its recording material film. The light beam is radiated by an "optical pickup" that includes a light source and an objective lens that focuses the light beam emitted from the light source on the optical tape 4. When the optical pickup irradiates the optical tape 4 with a light beam, the irradiated portion of the optical tape 4 comes to have a different optical property such as a refractive index from the rest (i.e., the non-irradiated portion) of the optical tape. Such a portion, of which the optical property has changed in this manner, is called a "recorded mark".

In optical tape technologies, data can be read out from the optical tape 4 by irradiating the tape 4 with a relatively weak light beam with a constant intensity and detecting the light that has been modulated by, and reflected from, the optical tape 4. In writing data on the optical tape 4, data is written there by irradiating the optical tape 4 with a pulsed light beam, of which the optical power has been changed according to the data to be written, and locally changing the property of the recording material film.

When data is going to be written on the recording material film of the optical tape 4, the recording material film is irradiated with such a light beam, of which the optical power has been modulated as described above, thereby recording an amorphous mark on a crystalline recording material film. Such an amorphous recorded mark is left there by heating a portion of the recording material film that has been irradiated with a writing light beam to a temperature that is equal to or higher than its melting point and then rapidly cooling that portion. If the optical power of a light beam that irradiates the recorded mark is set to be relatively low, the temperature of the recorded mark being irradiated with the light beam does not exceed its melting point and the recorded mark will turn crystalline again after having been cooled rapidly (i.e., the recorded mark will be erased). In this manner, the recorded mark can be rewritten over and over again. However, if the power of the light beam for writing data had an inappropriate level, then the recorded mark would have a deformed shape and sometimes it could be difficult to read the data as intended.

To read or write data from/on the optical tape 4, the light beam always needs to maintain a predetermined converging state on a target track. For that purpose, a "focus control" and a "tracking control" need to be done. The "focus control" means controlling the position of an objective lens along a normal to the surface (i.e., recording surface) of the optical tape 4 so that the focal point (or at least the converging point) of the light beam is always located on the target track. On the other hand, the "tracking control" means controlling the position of the objective lens parallel to the surface (recording surface) of the optical tape 4 and perpendicularly to the track so that the light beam spot is always located right on the target track.

In order to perform such a focus control or a tracking control, the focus error or the tracking error needs to be detected based on the light that has been reflected from the optical tape 4 and the position of the light beam spot needs to be adjusted so as to reduce the error as much as possible. The magnitudes of the focus error and the tracking error are respectively represented by a "focus error (FE) signal" and a "tracking error (TE) signal", both of which are generated based on the light that has been reflected from the optical tape 4.

1-1. Data Streamer Apparatus

Hereinafter, an embodiment of a data streamer apparatus (i.e., an optical tape storage device) including optical pickup devices according to the present invention will be described.

Figure 2A:
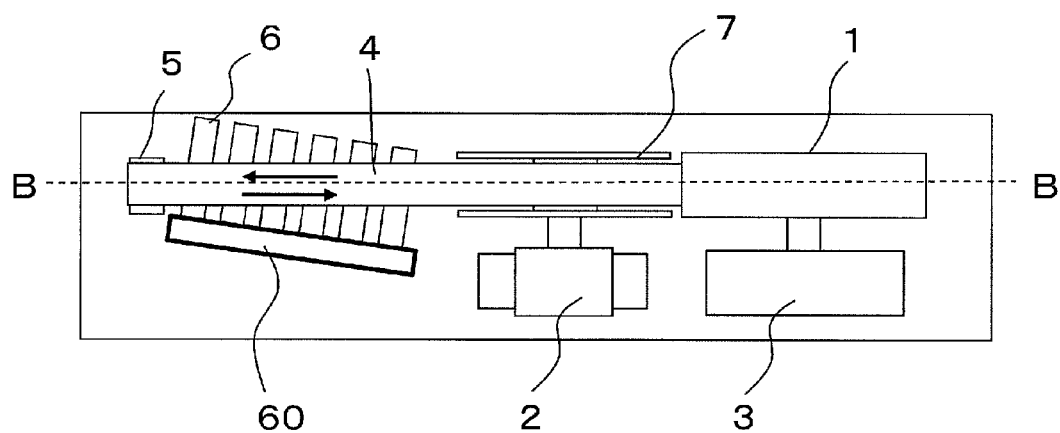
FIG. 2A illustrates an exemplary arrangement for a data streamer apparatus as an embodiment of the present invention.
Figure 2B:
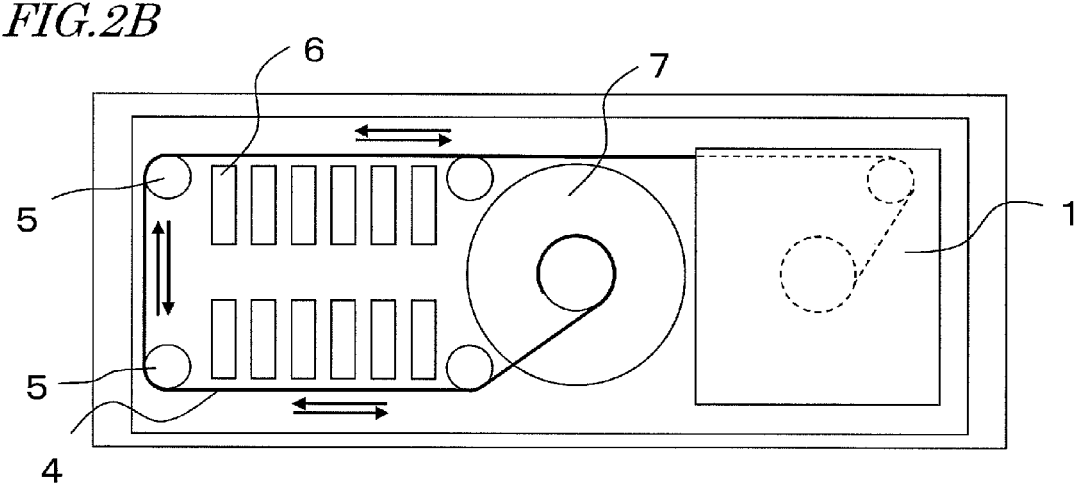
FIG. 2B is a cross-sectional view of the apparatus as viewed on the plane B-B shown in FIG. 2A.

FIG. 2A illustrates an exemplary arrangement for a data streamer apparatus (optical tape storage device) that can read and write data from/on an optical tape, and FIG. 2B is a cross-sectional view of the apparatus as viewed on the plane B-B shown in FIG. 2A.

FIGS. 2A and 2B illustrate a situation where the apparatus is loaded with a tape cartridge 1 in which the optical tape 4 is housed. The tape cartridge 1 is readily attachable and removable to/from the apparatus. And the data streamer apparatus shown in FIGS. 2A and 2B is loaded with a selected one of multiple tape cartridges 1 that have the same shape. This data streamer apparatus includes motors 2 and 3 that make the optical tape 4 run, guide posts 5 and a winding spool 7. The motor 2 is mechanically interlocked with the winding spool 7 that winds the optical tape 4 and turns the winding spool 7. On the other hand, the motor 3 is mechanically interlocked with the shaft of the tape cartridge 1 loaded and operates so as to wind the tape 4, which has been pulled out of the tape cartridge 1, back to the tape cartridge 1. Using these two motors 2 and 3, the tape 4 can run in both of the two directions that are indicated by the arrows.

The data streamer apparatus further includes an optical pickup unit 60 that accesses optically the optical tape 4 running. The optical pickup unit 60 includes a number of optical pickup devices 6 that are arranged in the direction in which the optical tape 4 runs. The structure of each of those optical pickup devices 6 will be described in detail later. The optical pickup unit 60 of this embodiment includes upper and lower arrays of optical pickup devices 6. However, the optical pickup unit 60 does not have to have such a configuration. Each of those optical pickup devices 6 includes a light source that emits a light beam, an objective lens that converges the light beam onto the tape 4, a lens actuator that drives the objective lens, and a photodetector that senses the light reflected from the optical tape 4 and generates necessary signals. The optical pickup devices 6 are connected to a circuit board (not shown) with wiring. And the circuit board has a circuit block that controls the optical pickup devices 6 and the motors 2 and 3.

Hereinafter, an exemplary circuit configuration for a data streamer apparatus according to this embodiment will be described with reference to FIG. 2C.

Figure 2C:
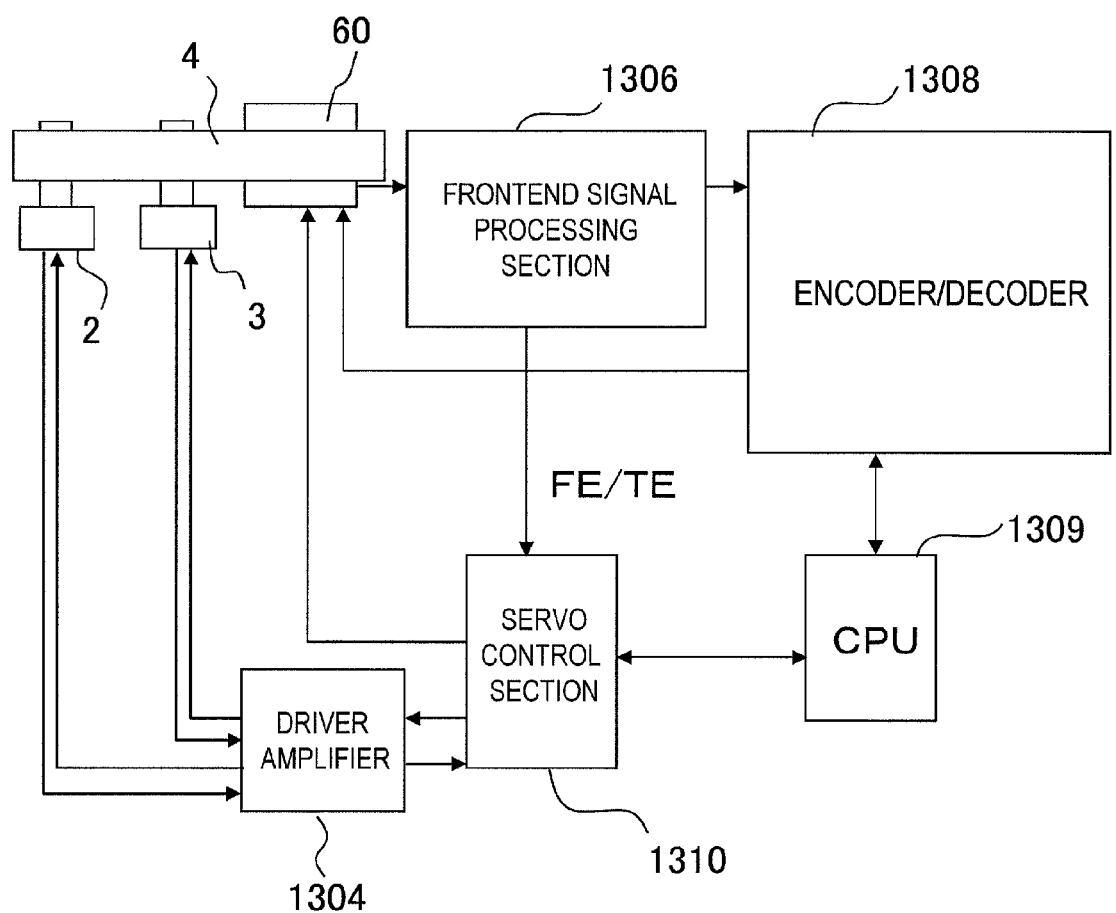
FIG. 2C is a block diagram illustrating a typical arrangement of circuit blocks in the data streamer apparatus according to the embodiment of the present invention.

The data streamer apparatus illustrated in FIG. 2C includes circuit blocks that are electrically connected to an optical pickup unit 60 and motors 2 and 3.

In the exemplary configuration shown in FIG. 2C, the output of the optical pickup unit 60 is supplied to an encoder/decoder 1308 by way of a frontend signal processing section 1306. In reading data, the encoder/decoder 1308 decodes the data that is stored on the optical tape 4 based on the signal that has been generated by the optical pickup unit 60. In writing data, on the other hand, the encoder/decoder 1308 encodes the data to generate a signal to be written on the optical tape 4 and outputs the signal to the optical pickup unit 60.

The frontend signal processing section 1306 generates a read signal, a focus error signal FE and a tracking error signal TE based on the output of the optical pickup unit 60. The focus error signal FE and the tracking error signal TE are then supplied to a servo control section 1310. In response, the servo control section 1310 gets the motors 2 and 3 controlled by a driver amplifier 1304. The servo control section 1310 also gets the position of an objective lens controlled by a lens actuator in the optical pickup unit 60. The encoder/decoder 1308, the servo control section 1310 and all the other components are controlled by a CPU 1309.

The blocks illustrated in FIG. 2C can be implemented by assembling together integrated circuit elements, memories and other electronic circuit components on either a single circuit board or multiple circuit boards. Such circuit board(s) is/are built in the data streamer apparatus and electrically connected to the optical pickup unit 60 and the motors 2 and 3.

The recording surface of the optical tape 4 that can be used in this embodiment may have a width of about 10 mm, for example. In that case, data can be read and written from/on the running optical tape 4 over the entire width thereof by twelve optical pickup devices 6, for example.

The configuration of the data streamer apparatus of this embodiment may be basically the same as that of a known data streamer apparatus that uses a magnetic tape. The data streamer apparatus of this embodiment is characterized by the configurations of the optical pickup devices and the optical pickup unit.

1-2. Optical Pickup Unit

Figure 3A:
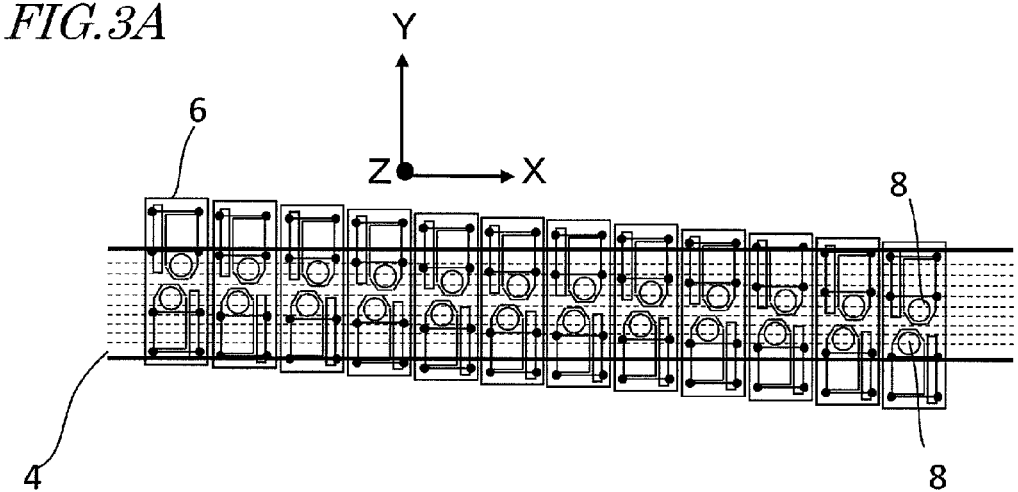
FIG. 3A illustrates an exemplary arrangement for optical pickup devices according to an embodiment of the present invention.
Figure 3B:
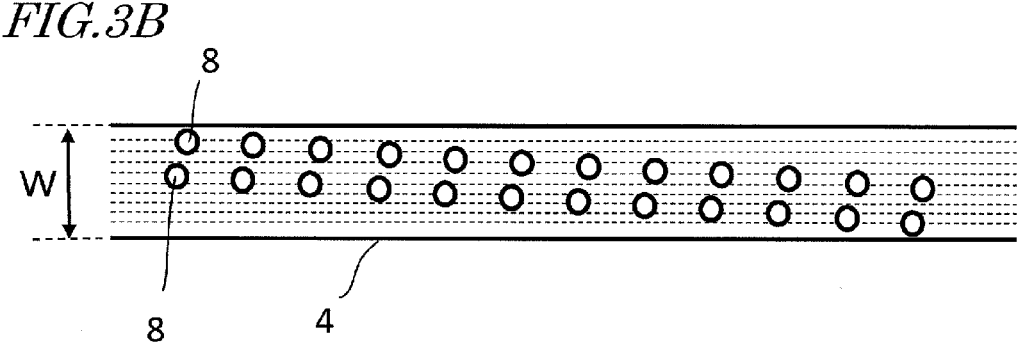
FIG. 3B illustrates an arrangement for the lenses of the optical pickup devices shown in FIG. 3A.

Next, an exemplary configuration for the optical pickup unit 60 of this embodiment will be described with reference to FIGS. 3A through 3C. FIG. 3A illustrates an exemplary arrangement for optical pickup devices that the optical pickup unit 60 has. FIG. 3B illustrates an arrangement for the twenty-four objective lenses 8 shown in FIG. 3A. And FIG. 3C illustrates another arrangement for those objective lenses 8.

As shown in FIG. 3A, the direction in which the tracks of the tape 4 run (which will be referred to herein as either a "track direction" or a "tape running direction") is supposed to be the X direction and the width direction of the tape 4 is supposed to be the Y direction. And the direction that intersects with both of the X and Y directions at right angles (i.e., the direction coming out of the paper on which FIG. 3A is drawn) is supposed to be the Z direction. In that case, when the optical tape 4 runs in the X direction (which includes both +X direction and −X direction), the light beam spot formed by the objective lens 8 of each optical pickup device 6 on the recording surface of the optical tape 4 needs to follow the target track. For that purpose, the focus control and the tracking control described above are carried out. Specifically, the focus control is carried out by adjusting the position of objective lens 8 in the direction coming out of the paper on which FIG. 3A is drawn (i.e., in the Z direction). On the other hand, the tracking control is carried out by adjusting the position of the objective lens 8 in the Y direction. That is why the direction coming out of the paper on which FIG. 3A is drawn and the Y direction will be sometimes referred to herein as a "focusing direction" and a "tracking direction", respectively.

A number of optical pickup devices 6 are arranged two-dimensionally as shown in FIG. 3A in order to read and write data from/on multiple tracks at the same time using those optical pickup devices 6. Also, if those optical pickup devices 6 are arranged to cover mutually different tracks as shown in FIG. 3A, then each of those optical pickup devices 6 needs to move its objective lens 8 by a shorter distance in the Y direction (i.e., in the tracking direction).

Figure 3C:
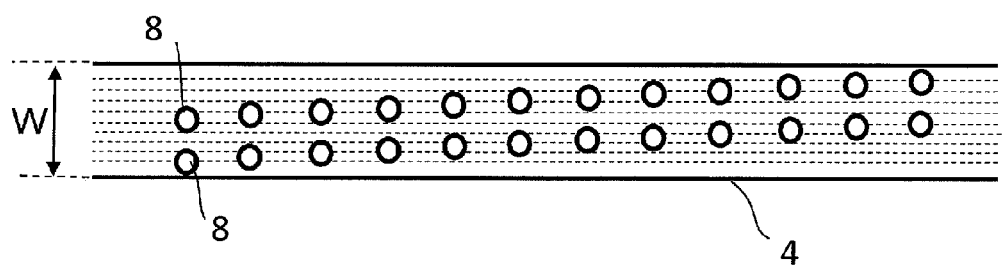
FIG. 3C illustrates another arrangement for those lenses.

Even if the tracks covered by those optical pickup devices 6 had better not overlap with each other, those optical pickup devices 6 do not always have to be arranged as shown in FIGS. 3A and 3B but may also be arranged as shown in FIG. 3C, for example. Or the tracks covered by those optical pickup devices 6 could overlap with each other.

Figure 4A:
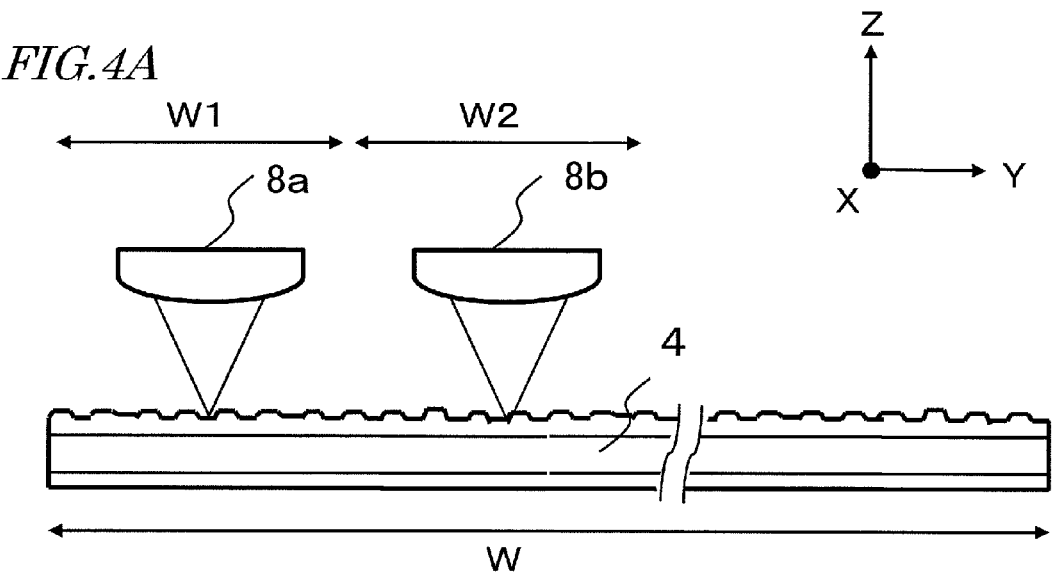
FIG. 4A is a cross-sectional view schematically illustrating the objective lenses 8a and 8b of two of those optical pickup devices.
Figure 4B:
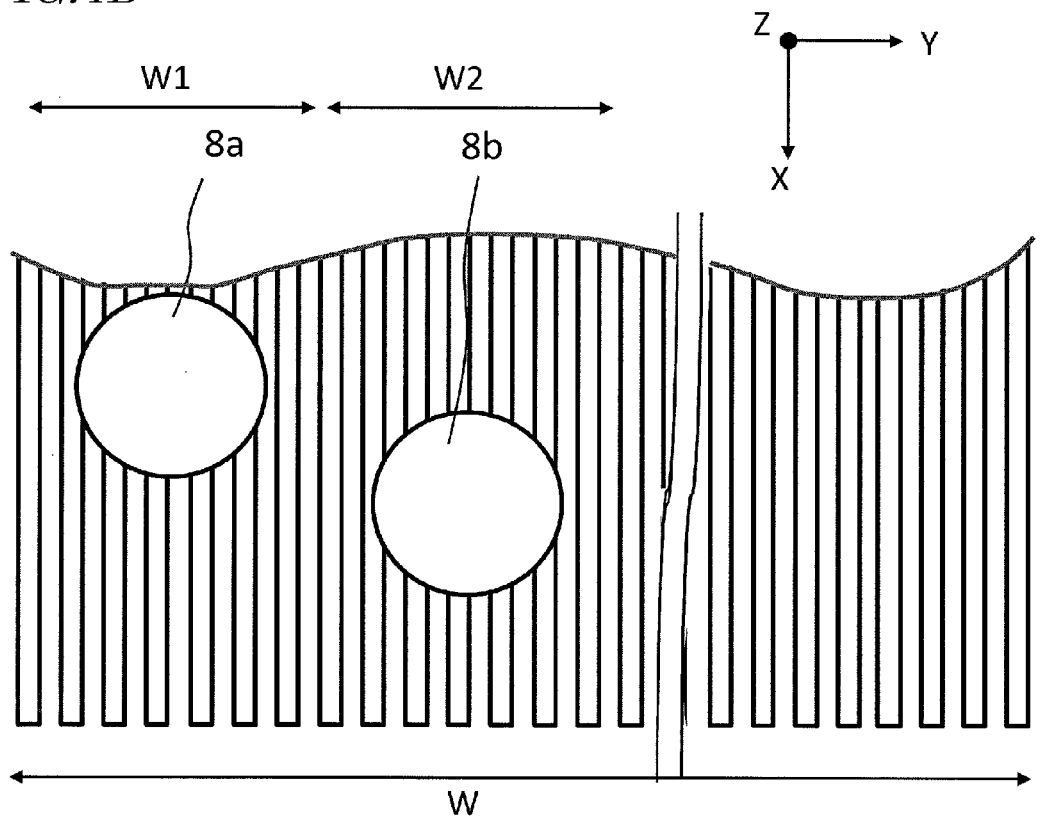
FIG. 4B is a plan view schematically illustrating an exemplary arrangement of those objective lenses 8a and 8b with respect to the surface of the optical tape.

FIG. 4A is a cross-sectional view schematically illustrating the objective lenses 8a and 8b of two of those optical pickup devices 6 and FIG. 4B is a plan view schematically illustrating an exemplary arrangement of those objective lenses 8a and 8b with respect to the surface of the optical tape 4. The positions of these objective lenses 8a and 8b are changed in the focusing direction (i.e., in the Z direction) and in the tracking direction (i.e., in the Y direction) by their lens actuator. The maximum movable ranges of the objective lenses 8a and 8b in the tracking direction (i.e., in the Y direction) are defined by the widths W1 and W2, respectively. If the objective lens 8 of each optical pickup device 6 can move up to about 1 mm in the tracking direction, then every track can be covered efficiently by arranging approximately ten or more optical pickup devices 6 with respect to an optical tape 4 with a width W of 10 mm.

Although not shown in FIGS. 4A and 4B, the optical pickup devices 6 actually have lens actuators to change the positions and orientations of the objective lenses 8a and 8b. That is why if a lot of objective lenses 8 are arranged in line in the width direction of the optical tape 4 (i.e., in the Y direction), the maximum movable range of each objective lens 8 in the tracking direction (i.e., in the Y direction) is restricted by the structure of its lens actuator. That is why a number of optical pickup devices 6 may be arranged in the track direction (i.e., in the X direction) as shown in FIGS. 3A, 3B and 3C.

In FIGS. 4A and 4B, no structure that will interfere with the lenses' movement is illustrated at all between the two objective lenses 8a and 8b and the respective maximum movable ranges of those objective lenses 8a and 8b are adjacent to each other with almost no gap left between them. It is difficult for a lens actuator adopted in a conventional optical pickup device to realize such an arrangement. Hereinafter, a specific configuration for an optical pickup device 6, of which the structure is designed so that their two objective lenses 8a and 8b can be arranged close to each other, will be described.

1-3. Optical Pickup Device

Figure 5:
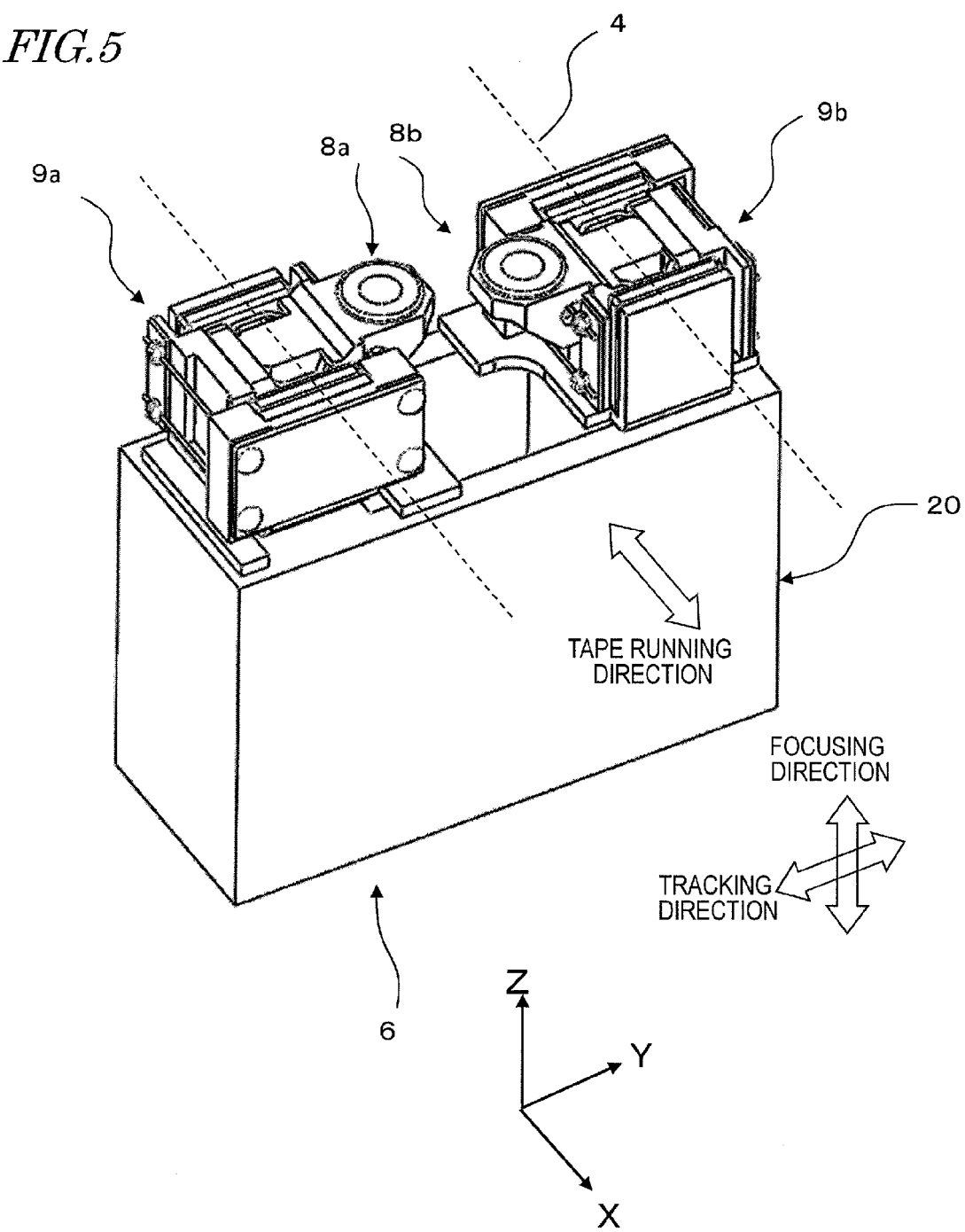
FIG. 5 is a perspective view illustrating a configuration for a pair of optical pickup devices according to an embodiment of the present invention.

FIG. 5 is a perspective view illustrating a configuration for an optical pickup device 6 according to this embodiment. This optical pickup device 6 includes an optical base 20 and two lens actuators 9a and 9b that are fixed on the upper surface of that optical base 20. In other words, in this optical pickup device 6, two optical pickups that can drive two objective lenses 8a and 8b independently of each other are integrated together. The configuration shown in FIG. 3A is realized by using twelve optical pickup devices 6, each having the configuration shown in FIG. 5. In FIG. 5, the edges of the optical tape 4 are indicated by the dotted lines. If a number of optical pickup devices 6 are arranged in the tape running direction shown in FIG. 5, it will be efficient to change the track range covered by each pair of objective lenses 8a and 8b with respect to the single optical tape 4 from one optical pickup device to another.

Also, if the optical pickup devices 6 with the configuration shown in FIG. 5 are arranged beside the optical tape 4 running, the size of each optical pickup device 6 as measured in the tape running direction (i.e., in the X direction) is as small as possible in one embodiment. Generally speaking, to store data of a huge size, a lot of data streamer apparatuses, each having the configuration shown in FIGS. 2A and 2B, are often housed in a multi-stage cabinet. In that case, however, each of those data streamer apparatuses is allowed so narrow a space that the data streamer apparatus may not have its size increased by its optical pickup devices 6. However, according to this embodiment, the optical pickup devices 6 can be arranged at a narrow pitch in the tape running direction. For example, the size of each optical pickup device 6 as measured in the tape running direction may be set to be 10 mm or less.

In the optical pickup device 6 shown in FIG. 5, two objective lenses 8a and 8b are arranged parallel to the recording surface of the optical tape 4. The distance between the respective centers of these two objective lenses 8a and 8b as measured in the tracking direction (i.e., in the Y direction) falls within the range of 4 to 8 mm, and may be set to be about 6 mm, for example. These two objective lenses 8a and 8b form light beam spots on two different tracks on the recording surface of the optical tape 4 and follow those tracks with the light beam spots, thereby performing read and write operations. The positions of those two objective lenses 8a and 8b may be controlled independently of each other in the focusing and tracking directions by their associated lens actuators 9a and 9b. A laser diode that emits a light beam to be condensed by the two objective lenses 8a and 8b is built in the optical base 20.

1-4. Lens Actuator

Figure 6:
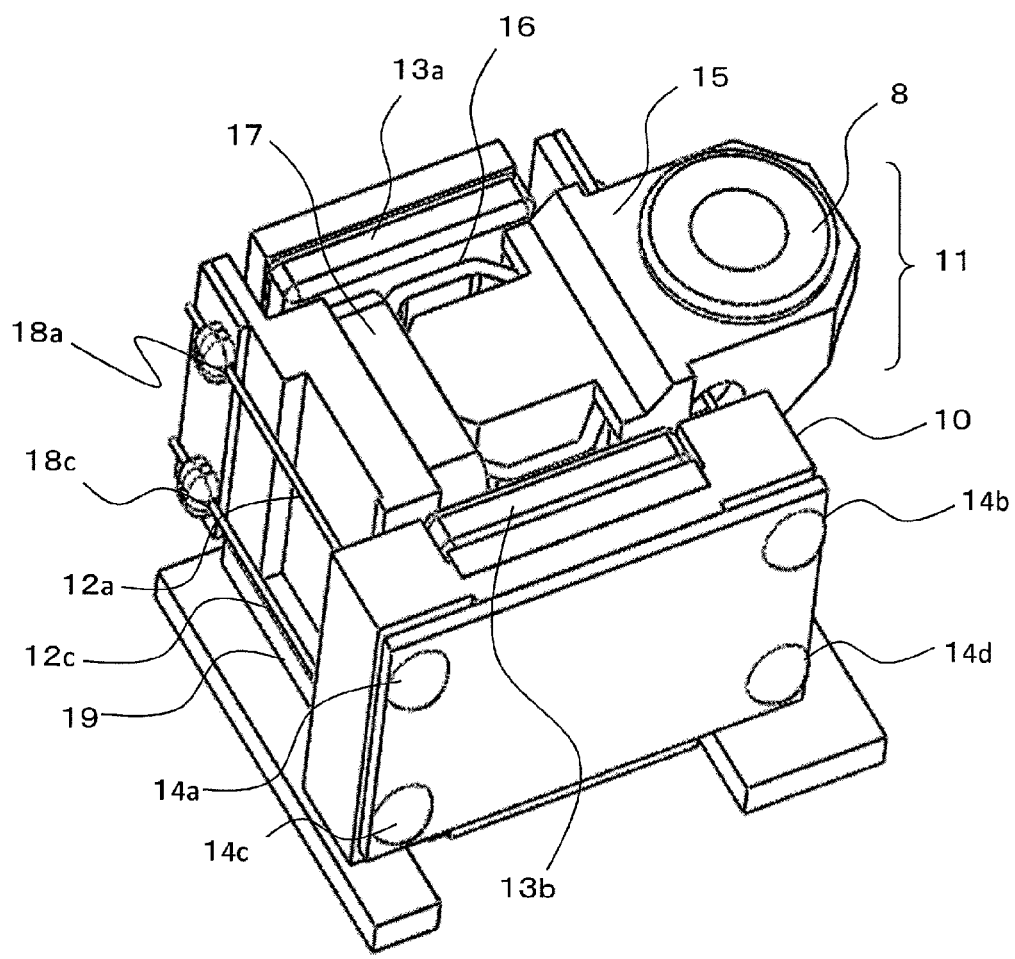
FIG. 6 is a perspective view of each of the optical pickup devices shown in FIG. 5.

FIG. 6 is a perspective view illustrating the lens actuator 9a, 9b of the optical pickup device 6 shown in FIG. 5 and FIG. 7 is an exploded perspective view thereof. Since those lens actuators 9a and 9b have basically the same configuration, those two lens actuators 9a and 9b will be collectively referred to herein as a "lens actuator 9". In the same way, the objective lenses 8a and 8b will also be collectively referred to herein as an "objective lens 8". FIG. 8A is a top view of the lens actuator 9 as viewed parallel to the optical axis of the objective lens 8, and FIG. 88 illustrates the relative arrangement of some of the members shown in FIG. 8A.

First of all, look at FIG. 7. As can be seen from FIG. 7, the lens actuator 9 includes a fixed portion 100, a movable portion 11, of which the position and orientation can be changed with respect to the fixed portion 100, and elastic supporting members (e.g., wires) 12a through 12d that couple elastically the movable portion 11 to the fixed portion 100. The movable portion 11 holds the objective lens 8. By changing the position and orientation of the movable portion 11, the objective lens 8 can be moved in the focusing direction and/or the tracking direction.

To the fixed portion 100 of this embodiment, attached are two magnets 13a and 13b, which are arranged to apply magnetic force to at least a portion of the movable portion 11. The fixed portion 100 includes a base portion 10, which is fixed on the body of the optical pickup device 6. The base portion 10 has wire securing portions 14a through 14d, to which the wires 12a through 12d are secured at one end thereof.

Next, as shown in FIG. 8A, the movable portion 11 of this embodiment includes a holder 15 that holds the objective lens 8, a focus coil 16 that generates driving force in the focusing direction, a pair of tracking coils 17 that generate driving force in the tracking direction (i.e., in the Y direction), and wire securing portions 18a through 18d, to which the wires 12a through 12d are respectively secured at the other end. FIG. 8A illustrates the arrangement of the movable portion 11 as viewed parallel to the optical axis of the objective lens 8. Although only the upper ones 12a, 12b, 14a, 14b, 18a and 18b of the four wires 12a through 12b and the eight wire securing portions 14a through 14d and 18a through 18d are illustrated in FIG. 8A, the other wires 12c and 12d and the other wire securing portions 14c, 14d, 18c and 18d are actually present under them and just hidden in FIG. 8A. Also, even though only the wire securing portions 18a and 18c are illustrated in FIG. 7, the other wire securing portions 18b and 18d are provided for the movable portion 11 so as to face the wire securing portions 18a and 18c, respectively.

Optionally, the magnets 13a and 13b may also be provided for the movable portion 11 and the focus coil 16 and the tracking coils 17 may be provided for the fixed portion 100 instead. In that case, not only those magnets but also coils can also function as a magnetic field generator.

Two (12a and 12c) of the four wires 12a through 12d are arranged at one end of the actuator 9 in the tracking direction, while the other two wires 12b and 12d are arranged at the other end of the actuator 9 in the tracking direction. Also, to make the movable portion 11 movable in both of the focusing and tracking directions, the wires 12a through 12d are secured to the base portion 10 and the movable portion 11 so as to be substantially parallel to the running direction of the optical tape 4.

In order to move the movable portion 11 with as small power dissipation as possible while keeping the mechanical strength of the wires 12a through 12d sufficiently high, the ratio of the effective length 1 of the wires 12a through 12d to the width L0 of the optical pickup device 6 as measured in the tape running direction (i.e., in the X direction) is as large as possible in one embodiment. For that purpose, one group of wire securing portions 14a through 14d provided at one end of the wires 12a through 12d is arranged near one end of the space occupied by the optical pickup device 6 in the tape running direction (i.e., in the X direction). Meanwhile, the other group of wire securing portions 18a through 18d provided at the other end of the wires 12a through 12d is arranged near the opposite end of the space occupied by the optical pickup device 6 in the tape running direction. In FIG. 8A, the width L0 of the optical pickup device 6 as measured in the tape running direction (i.e., in the track direction) is shown for your reference. This width L0 corresponds to the width of the optical base 20 (as measured in the track direction) in the exemplary configuration shown in FIG. 5. Also, if a number of optical pickup devices 6, every one of which has the same structure and the same size, are arranged densely in the tape running direction, then L0 corresponds to the arrangement pitch. The 1/L0 ratio is may be at least 0.7 in one embodiment, and may be 0.8 or more in a specific embodiment.

As described above, the two objective lenses 8a and 8b shown in FIG. 5 are arranged close to each other in the tracking direction but can operate independently of each other. According to this embodiment, at one end of the objective lens in the tracking direction, neither wires nor any member other than the objective lens is arranged. That is why the objective lens 8 is arranged, in the tape running direction, between the wire securing portions 14a through 14d of the base portion 11 and the wire securing portions 18a through 18d of the movable portion 11, and is arranged, in the tracking direction, outside of one (12b and 12d) of the two pairs of wires 12a through 12d that are arranged at both ends of the actuator 9. Optionally, the four wires 12a through 12d may be replaced with two elastic supporting members.

This respect will be described with reference to FIG. 8B.

Figure 8B:
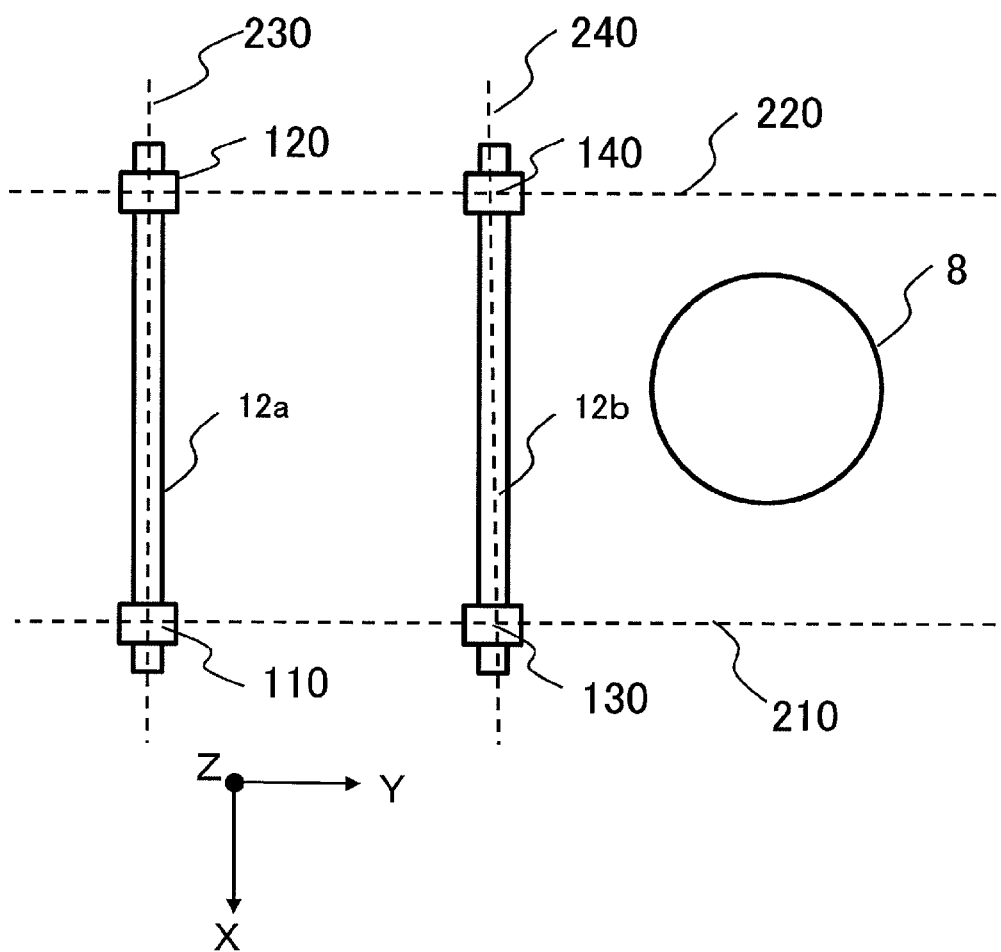
FIG. 8B illustrates the relative arrangement of some of the members shown in FIG. 8A.

FIG. 8B illustrates a first point of connection 110 between the wire 12a (which is a first elastic supporting member) and the fixed portion 100, a second point of connection 120 between the wire 12a and the movable portion 11, a third point of connection 130 between the wire 12b (which is a second elastic supporting member) and the fixed portion 100, and a fourth point of connection 140 between the wire 12b and the movable portion 11, all of which are viewed parallel to the optical axis of the objective lens 8. These points of connection 110, 120, 130 and 140 are located at the four vertices of a quadrilateral. And the first, second, third and fourth points of connection 110, 120, 130 and 140 correspond to the wire securing portions 14a, 18a, 14b and 18b, respectively.

Suppose the line that passes the first and third points of connection 110 and 130, the line that passes the second and fourth points of connection 120 and 140, the line that passes the first and second points of connection 110 and 120, and the line that passes the third and fourth points of connection 130 and 140 are called first, second, third and fourth lines 210, 220, 230 and 240, respectively. In that case, a feature of this embodiment is that the center of the objective lens 8 is located inside of the area between the first and second lines 210 and 220 but outside of the area between the third and fourth lines 230 and 240. In other words, the movable portion 11 of the actuator 9 is provided with the objective lens 8 that is arranged at one end in the tracking direction.

Unless the center of mass of the movable portion 11 agrees with the center of the focus driving force generated by the focus coil 16 in the tracking direction, imbalance is easily produced between the center of mass and the focus driving force when the actuator operates in the focusing direction. And once such imbalance has been produced, the objective lens 8 could get tilted unintentionally. That is why to make the center of mass of the movable portion 11 agreeing with, or at least close to, the center of the focus driving force, a counter weight 19 may be provided for the movable portion 11 in one embodiment of the present invention. In such an embodiment, the objective lens 8, the focus coil 16 and the counter weight 19 are arranged in this order in the tracking direction. The counter weight 19 may be made of the same material as the movable portion 11 (e.g., its portion around which the focus coil 16 is wound) so as to form an integral part of the movable portion 11 or may also be made of a different material from the movable portion 11.

According to this embodiment, the size of the lens actuator 9 as measured in the tape running direction can be reduced. As a result, a lot of optical pickups can be arranged densely and close to each other so as to face the optical tape 4.

Portion (a) of FIG. 9 shows the length L1 of the optical pickup unit of this embodiment as measured in the tape running direction, while portion (b) of FIG. 9 shows the length L2 of an optical pickup unit as a comparative example. As can be seen easily by comparing these drawings, L1 is smaller than L2.

When viewed parallel to the optical axis of the objective lens, the wires 12a and 12b are substantially as long as the width L0 of the upper surface of the optical base (i.e., the size of the front surface in the length direction of the wires 12a and 12b that are the first and second elastic supporting members). Also, according to this embodiment, when measured in the tape running direction (i.e., in the storage medium track direction), the ratio of the length of the first or second elastic supporting member to the interval between the respective centers of two adjacent optical pickup devices is 80% or more.

By using optical pickup devices with such a configuration, the size of the optical pickup unit as measured in the tape running direction can be reduced. Also, according to this embodiment, two lens actuators 9a and 9b are attached to a single optical base, and therefore, the objective lenses 8a and 8b that are arranged close to each other in the tracking direction can be positioned with high precision.

Alternatively, an optical pickup device 6c with one objective lens 8c and an optical pickup device 6d with another objective lens 8d may be attached to two different optical bases as shown in FIG. 10.

Hereinafter, another embodiment of an optical pickup device according to the present invention will be described with reference to FIG. 11.

The movable portion 11 of the actuator 9 is also provided with the objective lens 8 at one end in the tracking direction. As already described for the first embodiment, unless the center of mass of the movable portion 11 agrees with the center of the focus driving force generated by the focus coil 16 in the tracking direction, imbalance is easily produced between the center of mass and the focus driving force when the actuator operates in the focusing direction. And once such imbalance has been produced, the objective lens 8 could get tilted unintentionally. That is why the movable portion 11 is provided in this embodiment with the tracking coil 17 only at the other end (i.e., opposite to the objective lens 8) in the tracking direction, thereby adjusting the position of the center of mass. The coil is made mostly of copper, and therefore, has a heavier specific gravity than the holder 15 or any other member of the movable portion 11. That is why by providing the single tracking coil 17 at the opposite end to the objective lens 8, the weight of the objective lens 8 can be canceled with that of the tracking coil 17. As a result, in the movable portion 11, the objective lens 8, the focus coil 16, and the tracking coil 17 are arranged substantially in line in this order in the tracking direction.

An optical pickup device and optical pickup unit according to the present invention can be used effectively in a data streamer apparatus that uses an optical tape as a storage medium.

While the present invention has been described with respect to embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-188429 filed Aug. 31, 2011 and No. 2012-042923 filed Feb. 29, 2012, the entire contents of which are hereby incorporated by reference.

What is claimed is:

1. An optical pickup device comprising a laser diode and a lens actuator,
   the lens actuator comprising:
   an objective lens;
   a fixed portion;

a movable portion that supports the objective lens, configured to change the position and orientation of the objective lens with respect to the fixed portion;

a magnetic field generator configured to apply magnetic force to at least part of the movable portion; and first and second elastic supporting members that couple the movable portion elastically to the fixed portion, and wherein when viewed parallel to the optical axis of the objective lens, a first point of connection between the first elastic supporting member and the fixed portion, a second point of connection between the first elastic supporting member and the movable portion, a third point of connection between the second elastic supporting member and the fixed portion, and a fourth point of connection between the second elastic supporting member and the movable portion are respectively located at the four vertices of a quadrilateral; the center of the objective lens is located inside of an area that is defined between a first line that passes the first and third points of connection and a second line that passes the second and fourth points of connection and is located outside of an area that is defined between a third line that passes the first and second points of connection and a fourth line that passes the third and fourth points of connection.

2. The optical pickup device of claim 1, wherein the movable portion includes a coil configured to receive magnetic force from the magnetic field generator according to the amount of current, and wherein when viewed parallel to the optical axis of the objective lens, the coil is located inside of both the area between the first and second lines and the area between the third and fourth lines.

3. The optical pickup device of claim 2, wherein the movable portion includes a counter weight with a predetermined weight, and wherein when viewed parallel to the optical axis of the objective lens, the counter weight is located inside of the area between the first and second lines and the coil is located between the counter weight and the objective lens.

4. The optical pickup device of claim 2, wherein the coil is divided into a focus coil portion and a tracking coil portion.

5. The optical pickup device of claim 1, wherein the fixed portion includes a plate portion that runs perpendicularly to the third and fourth lines and that supports the first and second elastic supporting members.

6. The optical pickup device of claim 1, further comprising an optical base that has the laser diode built in and that has upper and side surfaces, wherein the actuator is secured to the upper surface of the optical base.

7. The optical pickup device of claim 6, wherein the length of the first and second elastic supporting members is substantially equal to the size of the upper surface of the optical base as measured in the length direction of the first and second elastic supporting members.

8. An optical pickup unit comprising a plurality of optical pickup devices, each said optical pickup device including a laser diode and a lens actuator, the lens actuator comprising:

an objective lens;

a fixed portion;

a movable portion that supports the objective lens, configured to change the position and orientation of the objective lens with respect to the fixed portion;

a magnetic field generator configured to apply magnetic force to at least part of the movable portion; and first and second elastic supporting members that couple the movable portion elastically to the fixed portion, and wherein when viewed parallel to the optical axis of the objective lens, a first point of connection between the first elastic supporting member and the fixed portion, a second point of connection between the first elastic supporting member and the movable portion, a third point of connection between the second elastic supporting member and the fixed portion, and a fourth point of connection between the second elastic supporting member and the movable portion are respectively located at the four vertices of a quadrilateral; the center of the objective lens is located inside of an area that is defined between a first line that passes the first and third points of connection and a second line that passes the second and fourth points of connection and is located outside of an area that is defined between a third line that passes the first and second points of connection and a fourth line that passes the third and fourth points of connection.

9. The optical pickup unit of claim 8, wherein the plurality of optical pickup devices include two optical pickup devices, and wherein in each of the two optical pickup devices, the objective lens is located closer to the second elastic supporting member than to the first elastic supporting member and is also located between its own and the other optical pickup device's second elastic supporting members.

10. The optical pickup unit of claim 9, wherein an interval of 4 to 8 mm is left between the respective centers of the objective lenses of the two optical pickup devices.

11. A data streamer apparatus comprising:

the optical pickup unit of claim 8; and a motor that drives an optical tape.

* * * * *